United States Patent
Gautier et al.

(10) Patent No.: US 9,513,185 B2
(45) Date of Patent: Dec. 6, 2016

(54) INFLATABLE DETECTING ELEMENT, MODULAR DETECTION CABLE AND DETECTION SYSTEM FOR DETECTING LEAKS OF NONCONDUCTIVE LIQUID

(71) Applicant: TTK, Trappes (FR)

(72) Inventors: Olivier Gautier, Neuilly sur Seine (FR); Olivier Gillot, Neuilly sur Seine (FR); Stefan Balatchev, Ottawa (CA)

(73) Assignee: TTK, Trappes (FR)

( * ) Notice: Subject to any disclaimer, the term of this patent is extended or adjusted under 35 U.S.C. 154(b) by 0 days.

(21) Appl. No.: 15/034,763

(22) PCT Filed: Nov. 4, 2014

(86) PCT No.: PCT/EP2014/073733
§ 371 (c)(1),
(2) Date: May 5, 2016

(87) PCT Pub. No.: WO2015/067615
PCT Pub. Date: May 14, 2015

(65) Prior Publication Data
US 2016/0290887 A1    Oct. 6, 2016

(30) Foreign Application Priority Data
Nov. 8, 2013 (FR) ..................... 13 60955

(51) Int. Cl.
*G01M 3/08* (2006.01)
*G01M 3/04* (2006.01)
(Continued)

(52) U.S. Cl.
CPC ............. *G01M 3/045* (2013.01); *G01M 3/165* (2013.01); *G01M 3/18* (2013.01)

(58) Field of Classification Search
CPC ....... G01M 3/26; G01M 3/2846; G01N 25/72; G01N 3/12
(Continued)

(56) References Cited

U.S. PATENT DOCUMENTS 3,970,863 A * 7/1976 Kishikawa ............ G01M 3/045
200/61.04
5,015,958 A * 5/1991 Masia ................... G01M 3/045
174/11 R
(Continued)

FOREIGN PATENT DOCUMENTS

DE    2453215    5/1976
FR    2998753    5/2014

OTHER PUBLICATIONS

French Search Report from French Patent Application No. 1360955, dated Sep. 1, 2014.
(Continued)

*Primary Examiner* — Lisa Caputo
*Assistant Examiner* — Nigel Plumb
(74) *Attorney, Agent, or Firm* — Greer, Burns & Crain, Ltd.

(57) ABSTRACT

A detecting element is provided for detecting leaks of an electrically nonconductive liquid, in particular of hydrocarbons, as well as a detection cable and a detection system using such a detecting element. The detecting element includes a detection member made of a material which inflates upon contact with the liquid and which is loaded with electrically conductive particles, to be conductive when not contaminated by the liquid, and to lose the conductivity when inflating from contact with the liquid. The detection member is electrically connected to an electronic management module, which is arranged for detecting the presence of the liquid by noticing a decrease in the conductivity of the detection member. In a preferred embodiment, the detection (Continued)

cable includes four insulated conductive wires, one of which is embedded in the detection member which is itself protected by an inflatable casing, which is also insulating and water-proof.

16 Claims, 5 Drawing Sheets

(51) Int. Cl.
 *G01M 3/16* (2006.01)
 *G01M 3/18* (2006.01)
(58) Field of Classification Search
 USPC .................................. 73/49.1, 40, 37; 374/4
 See application file for complete search history.

(56) References Cited

U.S. PATENT DOCUMENTS

| | | | | |
|---|---|---|---|---|
| 5,101,657 A | * | 4/1992 | Lahlouh | G01M 3/165 340/604 |
| 5,341,128 A | * | 8/1994 | Keyser | G01M 3/165 174/11 R |
| 5,382,909 A | * | 1/1995 | Masia | G01D 11/00 174/11 R |
| 5,514,338 A | * | 5/1996 | Simon | G01N 27/12 340/605 |
| 5,546,790 A | * | 8/1996 | Kudo | G01M 3/16 340/605 |
| 5,574,377 A | * | 11/1996 | Marquez-Lucero | G01M 3/045 174/11 R |
| 6,317,540 B1 | * | 11/2001 | Foulger | G02B 6/4469 324/555 |
| 6,433,694 B1 | * | 8/2002 | Dolan | G01N 27/126 204/400 |

OTHER PUBLICATIONS

International Search Report from International Patent Application No. PCT/EP2014/073733, mailed Feb. 9, 2015.

\* cited by examiner

INFLATABLE DETECTING ELEMENT, MODULAR DETECTION CABLE AND DETECTION SYSTEM FOR DETECTING LEAKS OF NONCONDUCTIVE LIQUID

BACKGROUND

The present invention relates to a detecting element for a detection cable intended to detect leaks of electrically nonconductive liquid. The invention also relates to a detection cable implementing such a detecting element and a detection system making it possible to use such detection cables. It also relates to a method for producing such a detecting element and a method for producing such a detection cable.

The detecting element comprises at least one detection member produced from a material which swells upon contact with said liquid and which is filled with electrically conductive particles, such that the detection member is conductive when it is not contaminated by said nonconductive liquid, and that it loses conductivity when it swells under the effect of said liquid.

According to the invention, this detection member is electrically connected to an electronic module, referred to as management module, which is arranged in order to detect the presence of said liquid by recording a decrease in the conductivity of said detection member, typically by means of an ohmic measurement.

The field of the invention is the detection of leaks of electrically nonconductive liquid, in particular by means of detection cables and for example for hydrocarbons.

The detection and location of leaks of electrically nonconductive liquid are carried out by means of systems or facilities using detection cables, which are arranged at sites in which leaks are likely to occur or flow.

The detection cables known are of different types. Some use variations in the electromagnetic properties occurring when a liquid seeps between several cable wires. These variations are detected for example by measuring impedance variations resulting from variations in the capacitance between these wires or the inductance of such a cable. This technology provides performances which would benefit from improvement, for example in terms of detection speed and/or sensitivity. Moreover, the measurement principle requires quite complex electronics, which makes it costly to produce and can represent a particular sensitivity to the environment.

Others use the change of shape of an element produced from a "reactive" conductive material, which swells upon contact with the liquid to be detected and thus makes it possible to establish an electrical contact between different elements which are normally separate.

In document U.S. Pat. No. 5,101,657 for example, two detection wires, each formed by a bare conductive wire, extend without touching inside the cable over its entire length, and are surrounded by an insulating perforated sheath. This perforated sheath is surrounded by a casing produced from this reactive material, itself contained in a perforated retention casing.

When the reactive material swells under the effect of the liquid to be detected, the retention casing prevents it from expanding towards the outside. Thus it expands towards the inside and comes into contact with the two detection wires by passing through the insulating perforated sheath. The contaminated reactive material thus makes an electrical short circuit between the two bare wires. The drop in electrical resistance between the two detecting wires is used in order to indicate the presence of the liquid to be detected.

These technologies also have drawbacks. For example, the structure is complex and requires a precise positioning of the wires in order to avoid the short circuits between the detection wires in the absence of liquid, which is a source of complexity during production. It would also be useful to reduce the detection time or the sensitivity according to the quantity of liquid to be detected.

In document U.S. Pat. No. 5,341,128, a linear sensor formed by two conductive elements connected at the end thereof has also been proposed. One of the elements is metallic and the other is a swellable material sensitive to hydrocarbons and including a conductive filler. The detection therefore uses an electrical power supply and a resistance indicator. However, these technologies have drawbacks, for example a particular sensitivity of the sensor in a difficult environment, and in which the problems of sensitivity and harsh or even dangerous environments are not managed.

An aim of the invention is to wholly or partially overcome the drawbacks of the state of the art. This includes for example increasing the speed of detection or the sensitivity in the case of small quantities of liquids, obtaining greater robustness, a simpler and more cost-effective production or a simpler and more flexible use.

SUMMARY

The invention proposes a detecting element for a cable for the detection of leaks of an electrically nonconductive liquid, said detecting element comprising at least one sensor means which includes at least one detection member, produced at least partially from a material which swells upon contact with said liquid and which is filled with electrically conductive particles, such that:

the detection member is conductive when it is not contaminated by said nonconductive liquid, and the detection member loses its conductivity when it swells under the effect of said liquid.

Detection Method

According to the invention, this detection member is electrically connected to an electronic module, referred to as management module, which is arranged in order to detect the presence of said liquid by recording a decrease in the conductivity of said detection member, typically by means of an ohmic measurement.

This detection can be determined for example when the conductivity has a variation the magnitude of which exceeds a predetermined threshold or when the conductivity value falls below a predetermined threshold.

This detection method can be implemented in different configurations having different forms for the detection member, for example as a function of the envisaged applications and the geometry of the areas to be protected.

The detection member is produced from a material which swells when it is contaminated by the nonconductive liquid. This "swellable" material is filled with conductive particles, for example copper or carbon black particles which are in contact with each other when the material is not contaminated by the liquid to be detected. Such that this detection member is electrically conductive when it is not contaminated by the liquid to be detected.

When the detection member is in contact with the liquid, the volume of the material increases. As and when the material swells, the conductive particles contained in this material move away from each other and the detection member loses its electrical conductivity.

The detection member is preferably covered with a thin protective casing, having a continuous surface produced from a liquid pervious material the leak of which is to be detected, for example the same silicone but without a filling of conductive particles.

This detection method makes it possible to obtain a more rapid detection, with a reaction time for example of the order of 3-5 min in the case of gasoline or 15-20 min in the case of diesel.

It also makes it possible to reuse the detecting element once the detection member has been decontaminated and thus allows for real-time tests of the systems during production and once installed.

Compared to "mechanical" methods using the change of shape of the reactive material, it is understood that the detection obtained by means of the invention can be more reliable, in particular as it is less susceptible to thermal expansion or external mechanical load problems. It also depends significantly less on the geometry of the different constituent elements, and is therefore less complex to produce and more robust during installation and use.

This detection method can also be implemented by means of very simple electrical measurements, typically by ohmic measurement. These can be carried out by means of very simple, conventional, robust and compact electronics which are cost-effective to produce, manage and maintain.

Linear Applications

In the case of numerous applications, an elongated sensor in the form of a cable is used, which is connected on one side to a detection unit and runs along and below an object prone to leakage, for example a pipeline. This cable can also be arranged in an area in which leaks may be collected, for example at the bottom of a drain or a retention tank located under a fuel tank, or in numerous other configurations.

Thus, according to the invention, the sensor has an elongated bundle form with a proximal end and a distal end with respect to the management module and comprises moreover at least two insulated conductive wires, referred to as detection wires, thus forming a bundle with the detection member extending over the entire length of the detecting element. These detection wires are connected by one end referred to as proximal end to said management module.

According to the invention, this management module is arranged in order to:
  on the one hand detect the presence of liquid by recording a reduction in the conductivity of said detection member by means of a connection of a distal end of said detection member with the distal end of one of the conductive detection wires, referred to as return (or reference) wire, and
  on the other hand verify the continuity of the detecting element by recording the electrical continuity of a circuit established by connecting the distal end of the other conductive detection wire, referred to as continuity wire, with the distal end of said return wire.

According to a characteristic of the invention, the detection member preferably has the form of a casing surrounding at least one of said insulated conductive wires.

This detection method thus allows for great lengths for the detection element while still benefiting from the above-mentioned advantages.

By way of example, the invention typically makes it possible to produce linear portions of up to 20 m or even 40 m for the same management module.

Addressable Sensor

According to another aspect, the invention also proposes a sensor, or detection cable in the case of an elongated configuration, for the detection of leaks of nonconductive liquids.

According to the invention, this sensor comprises on the one hand at least one detecting element as disclosed here; and on the other hand at least one communication element including:
  at least one electronic communication module arranged in order to transmit a measurement or detection data item originating from said detecting element, in combination with a data item identifying said communication module and/or in response to a polling signal sent selectively to said communication module, and
  at least one insulated conductive wire, referred to as communication wire, forming a communication bus provided in order to carry a communication signal including such a polling signal and/or such a measurement data item, from and/or to said communication module, over the entire length of said detecting element, in cooperation with at least one conductive wire constituting a voltage reference, for example an earth wire.

The communication signal is preferably a digital signal.

Preferably, the communication bus comprises moreover at least two wires, referred to as a supply wires, insulated from each other and arranged in order to provide a power supply to one or more electronic modules arranged along said detection cable, or another similar or identical detection cable connected to it. Typically, the communication signal is produced or detected by comparison with the voltage of one of these two power supply wires.

By installing multiple iterations of such a sensor, with different identifying data, it is thus possible to distinguish from which sensor the detection information is derived, and thus in which protected area or site the detected leak is located.

Detection System

According to an aspect, the invention proposes a detection system ($590$, $690$, $790$) comprising a plurality of sensors ($500_1$ to $500_n$, $600_1$ to $600_n$, $700_1$ to $700_n$) as described here, and each arranged in order to receive a polling signal that is different from the others.

Typically but not necessarily, these multiple iterations are connected together in series, in order to form a "composite" cable. The different identifiers of the different sensors thus make it possible to detect a leak along this cable on a portion of this composite cable while still identifying the position of this leak more accurately.

In this case, a first sensor referred to as "upstream" sensor is connected by one end to a management unit or monitoring module ($608$) with which it exchanges all the communication signals of the entire composite cable and which preferably provides it with an electrical power supply. The communication (and power supply) bus of each sensor therefore carries the communication signals in both directions between the monitoring module and all the sensors located downstream thereof. Preferably, each sensor receives the electrical power supply from its upstream neighbour and supplies it to its downstream neighbour.

Preferably, the communication module is arranged in order to use a single communication wire:
  both for carrying and receiving a polling signal, and
  both for carrying and transmitting a measurement data item transmitted in response to said polling signal.

The number of conductors is limited therein, in the interests of simplicity, and the compactness and simplicity of the bundle.

According to the applications, the sensors can be connected together in different ways, by detachable connectors or permanent connectors, in order to form one or more composite cables.

In a particularly advantageous manner, the invention can be implemented, for the management modules thereof and for the communication (and power supply) bus, according to technologies complying with the anti-explosion standards in order to be able to install such elements or sensors (single or combined) in explosive environments or ATEX.

Such technologies are known to a person skilled in the art, or can be produced such as defined in the application FR 12 61349.

Various embodiments of the invention are envisaged, incorporating according to the set of their possible combinations the different optional characteristics described here.

BRIEF DESCRIPTION OF THE DRAWINGS

Other characteristics and advantages of the invention will become apparent from the detailed description of an embodiment which is in no way limitative, and the attached drawings, not to scale, in which.

DETAILED DESCRIPTION

Figure 1:
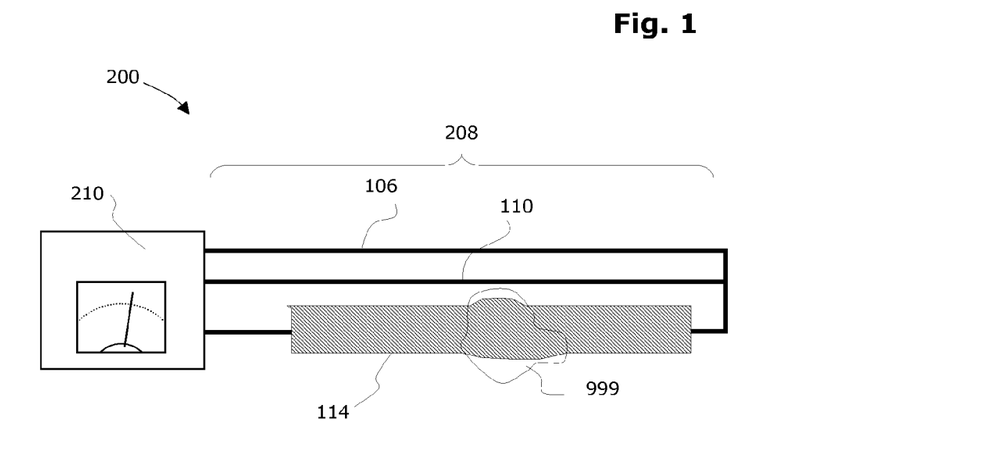
FIG. 1 is a diagrammatic side view illustrating an embodiment example of a detecting element according to the invention with sensor means in a linear form including return wire and continuity wire.

FIG. 1 is a diagrammatic side view illustrating an embodiment example of a detecting element according to the invention, with sensor means in a linear form including return wire and continuity wire.

The sensor 208 includes a detection member 114, produced at least partially from a material which swells upon contact with the liquid to be detected 999, and which is filled with electrically conductive particles, such that:

the detection member 114 is conductive when it is not contaminated by said nonconductive liquid to be detected, and the detection member 114 loses its conductivity when it swells under the effect of said liquid 999.

This sensor means has an elongate or linear form, with a proximal end and a distal end with respect to the management module 210. The detection member 114 is electrically connected to the electronic module referred to as management module 210 which carries out an ohmic measurement of its conductivity permanently or at regular intervals. This management module 210 uses this measurement in order to indicate the presence of the liquid to be detected 999 when it records a reduction in the conductivity of said detection member.

In the embodiments in which the detecting element is in a linear form connected on one side only, the sensor means comprises moreover at least one insulated conductive wire referred to as return wire (or reference wire), for example 110, forming a bundle with the detection member and which is connected by its proximal end to said management module 210.

The management module 210 carries out the measurement using this return wire, in order to detect the presence of liquid by recording a reduction of the conductivity of said detection member 114 by means of a connection of a distal end of said detection member with the distal end of this return wire (in this case on the right of the figure).

Preferably (but not necessarily), the sensor means comprises moreover at least a second insulated conductive wire referred to as continuity wire, 106 in this example, included in the bundle with the detection member, and which is connected by its proximal end to said management module 210.

In this case, the management module uses this continuity wire in order to verify the continuity of the sensor of the detecting element, by recording the electric continuity of a circuit established by connecting the distal end of the other conductive detection wire, referred to as continuity wire, with the distal end of said return wire.

Thus, when the management module records a loss of conductivity of the circuit formed by the detection member 114 and the return wire, while the circuit formed by the continuity wire and the wire is still conductive, it can indicate the presence of a contamination by the liquid to be detected 999.

In a different manner, when the management module 210 records that these two circuits have both lost their conductivity, i.e. a quasi-infinite resistance, it can indicate the presence of a break of the continuity wire, and thus very likely of the bundle as a whole.

The return wire and the continuity wire are in this case referred to as detection wires 110 and 110, and their roles are interchangeable, simply by changing their connections to the management module.

Figure 2:
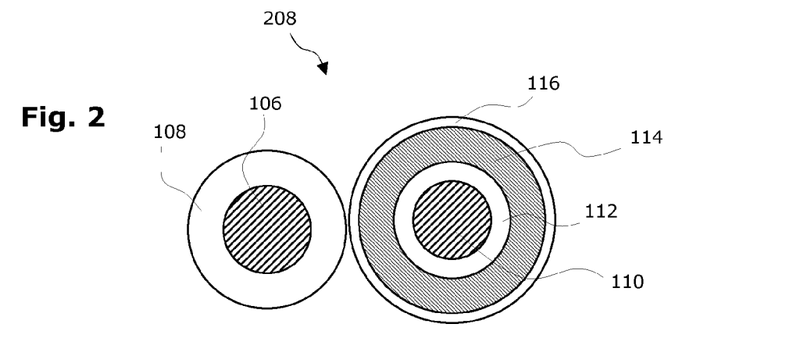
FIG. 2 is a diagrammatic cross-sectional view of the sensor means illustrating an embodiment example of a detecting element according to the invention with a detection casing surrounding a conductive wire.

FIG. 2 is a diagrammatic cross-sectional view of the sensor means illustrating an embodiment example of a detecting element according to the invention with a detection casing surrounding a conductive wire;

In FIG. 2, a particular embodiment is shown, in which the detection member 114 has the form of a casing covering one of said insulated conductive wires 110, in this case in a cylindrical manner.

The arrangement of the detection member as a casing covering one of the conductive wires has different advantages, such as for example to give greater mechanical resistance to the detection member the material of which in itself typically has a low resistance, for example to traction.

Once again, even when the detection wires have differentiated arrangements, from the point of view of the geometry of the bundle, it is to be noted that the selection of the wire used for the return function and of the wire used for the continuity function has little or no importance: for example the covered wire 110 can be used as return wire and the adjacent wire 106 as continuity wire, however the reverse selection can also be implemented.

As illustrated in FIG. 2, preferably but not necessarily, the detection member 114 (regardless of the geometry thereof) is moreover covered by an electrically insulating casing 116 which is impervious to one or more conductive liquids, in particular water, while allowing the nonconductive liquid to be detected to pass through. Typically, this material can be an insulating version of the swellable material used for the detection member itself, but without filler particles. The thickness thereof can be for example of the order of 30 μm.

The presence of this insulating casing makes it possible to prevent any electrical contact between the detection member 114 and any conductive liquid which may be present in the external environment. In fact, such a conductive liquid would risk distorting the conductivity measurements by increasing or maintaining the conductivity of the whole, even in the case of contamination, by short-circuiting the contaminated part of the detection member.

Thus a bundle resistant to water or even other conductive liquids is obtained, which can also be buried.

Figure 7:
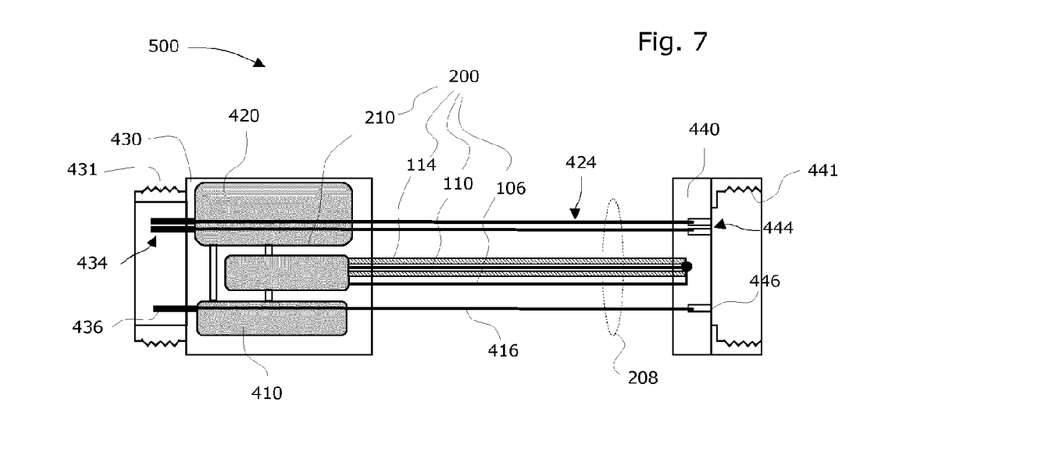
FIG. 7 is a diagrammatic side view illustrating an embodiment example of a sensor according to the invention, with detachable connection modules at the ends, for example one of the sensors in FIG. 6.

As illustrated for example in FIG. 7, in certain embodiments, the invention proposes moreover an addressable sensor 500 which comprises, in addition to one or more detecting elements 200 according to any of the configurations of the invention, at least one communication element including:
at least one electronic communication module 410 arranged in order to transmit a measurement or detection data item originating from said detecting element 200, in combination with a data item identifying said communication module and/or in response to a polling signal addressed selectively to said communication module, and
at least one insulated conductive wire 416, referred to as communication wire, forming a communication bus provided in order to carry a communication signal including such a polling signal and/or such a measurement data item, from and/or to said communication module 410, over the entire length of said detecting element 200, in cooperation with at least one conductive wire constituting a reference, for example a voltage reference such as an earth wire.

Preferably, the communication bus is incorporated into one and the same bundle with the conductive element and itself comprises at least two wires 424 providing an electrical power supply, for example one at 0V and the other at +5V.

Such a power supply incorporated into the sensor makes it possible to obtain one or more sensors which are all supplied by a single source, and can thus function autonomously within a facility of large dimensions. In this case, the communication signal is preferably carried in cooperation between the communication wire and one of the power supply wires, in a digital or analogue manner, for example by means of voltage variation between these two wires.

Optionally, the sensor 500 can comprise a local power supply module 420, which receives an electrical power supply from a monitoring unit via power supply wires 424, directly or via one or more other sensors. Alone or with its neighbours, this power supply module 420 makes it possible for example to supply the management module 210 and the communication module 410 locally with respect to the sensor.

Preferred Embodiment of the Bundle

Figure 3:
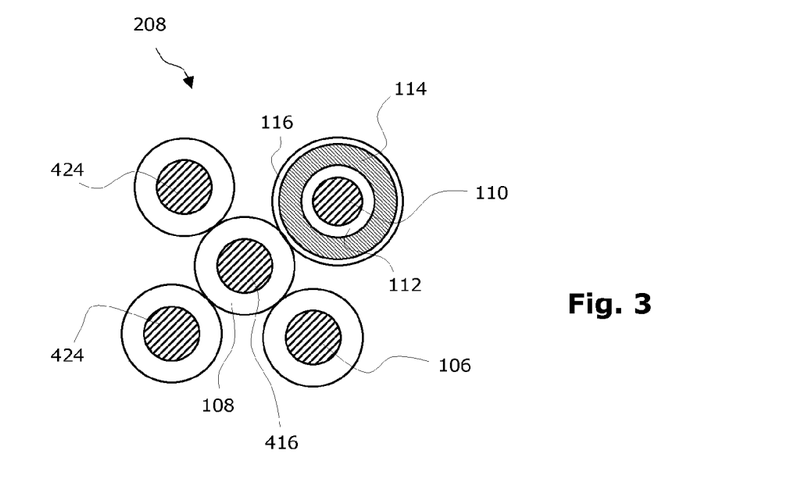
FIG. 3 is a diagrammatic cross-sectional view of the bundle, illustrating an embodiment example of the bundle of a sensor according to the invention, including a detecting element with a detection casing and a communication bus with three wires, twisted together around one of the insulated conductive wires.

FIG. 3 is a diagrammatic cross-sectional view of the bundle, illustrating an embodiment example of the bundle of a sensor according to the invention, including a detecting element with a detection casing and a communication bus with three wires, twisted together around one of the insulated conductive wires.

FIG. 3 illustrates an embodiment example of such a sensor in which the bundle comprises five insulated conductive wires 110, 106, 416, 424, one of which, 110, is covered by the detection casing 114, itself equipped with a swellable insulating sheath 116.

In this embodiment, the detection member 114 and three of the other insulated conductive wires, i.e. the conductive wires 106 and 424, surround a central core formed by the last of the insulated conductive wires, 416, with the insulating casing thereof, 108.

Preferably, these outer conductive wires 424, 106 and 110, with 114, are twisted around the central core 108.

The detection casing 114 is preferably arranged in the outer part of the bundle, in order to promote the contact thereof with the liquid to be detected.

On the other hand, in all embodiment examples comprising a communication bus, it is to be noted that the selection of the conductive wires used for the different functions has little or no importance: each conductive wire 110 or 106 or 416 or the two 424 can be used for one or other of the different roles presented in this case, return wire or continuity wire or communication wire or electrical supply wire, regardless of the position thereof within the transversal arrangement of the bundle.

A currently preferred configuration is to use the conductive wire 110 covered by the detection casing 114 in order to carry the communication signal, however all other distributions are in this case explicitly envisaged in the invention.

In this configuration mode, it is possible to obtain a cable with a diameter of the order of 6 mm to 8 mm.

Figure 4:
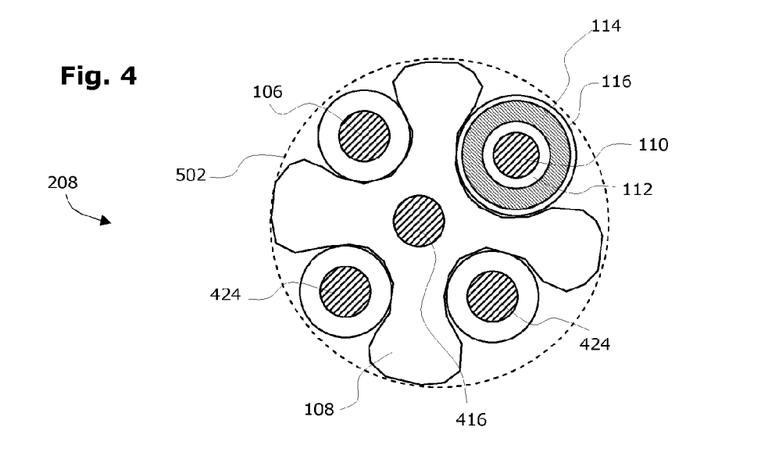
FIG. 4 is a diagrammatic cross-sectional view of the bundle illustrating a preferred embodiment example of the bundle of a sensor according to the invention, similar to the one in FIG. 3 with a crenellated insulating central core and a perforated protective sheath.
Figure 5:
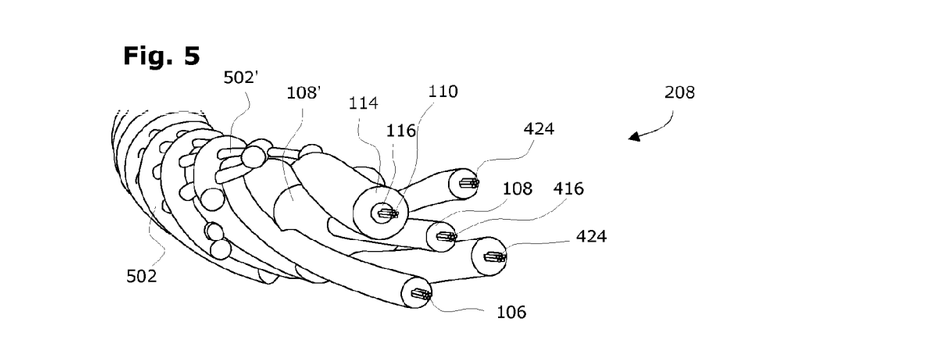
FIG. 5 is a perspective view representing an interrupted end of the bundle in FIG. 4, in a version with a protective sheath in the form of an extruded net.

FIG. 4 and FIG. 5 illustrate a currently preferred example embodiment of the invention relating to the transversal arrangement of the bundle of a sensor according to the invention.

In this embodiment, the bundle 208 encloses, within a perforated sheath 502 providing a mechanical protection:
the two insulated conductive detection wires, 106, 110 in this example, including a return wire and a continuity wire;
three insulated conductive wires forming the communication bus and including:
two insulated conductive wires 424 providing an electrical power supply, and
an insulated conductive wire forming the communication wire 416, in cooperation with one of said electrical power supply conductive wires.

As shown in the figure, the detection member has the form of a cylindrical detection casing 114 and its insulating pervious sheath 116, which covers one of said conductive wires 110 and its insulator 112. This detection member, with three other insulated conductive wires 106, 424 is arranged around a central core formed by the fifth insulated conductive wire 416.

As seen in FIG. 4 and FIG. 5, the outer surface of the central core, in this case of the insulator 108 of this central core or of an additional positioning layer 108', has a transversally, an alternation of protuberances and hollows forming longitudinal grooves in which the different conductive wires surrounding said central core are arranged, i.e. 110 and the casing thereof 114, 106, and the two wires 424.

In an embodiment example, as illustrated in FIG. 5, the outer mechanical protection 502 is provided by a perforated sheath produced from a single extruded element around the conductors of the bundle. For example, this sheath has a texture formed by two superimposed layers 502 and 502', each of said layers being constituted by several fibres parallel to each other, twisted around said bundle. These layers are twisted in opposite directions from each other. These two layers are produced by hot coextrusion, and their respective fibres are thus secured together from one layer to the other by fusion at their different points of intersection. Thus a strong net is obtained, resistant to unravelling and more rapid and cost-effective to produce than if it was necessary to twist or braid together individual wires.

This type of sheath may of course be applied to all embodiments comprising a linear bundle.

Figure 6:
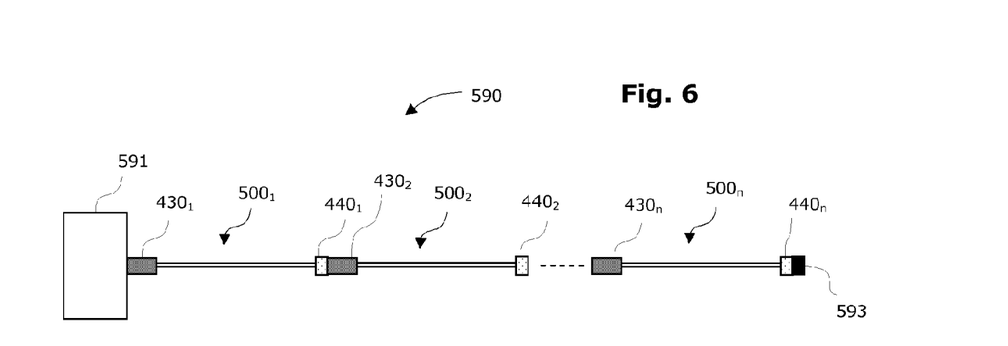
FIG. 6 is a diagrammatic side view illustrating an embodiment example of a detection system according to the invention, comprising a plurality of sensors with detachable connection modules fixed to the ends of the sensors.

FIG. 6 is a diagrammatic side view illustrating an embodiment example of a detection system according to the invention, comprising a plurality of sensors with detachable connection modules fixed to the ends of the sensors.

Figure 10:
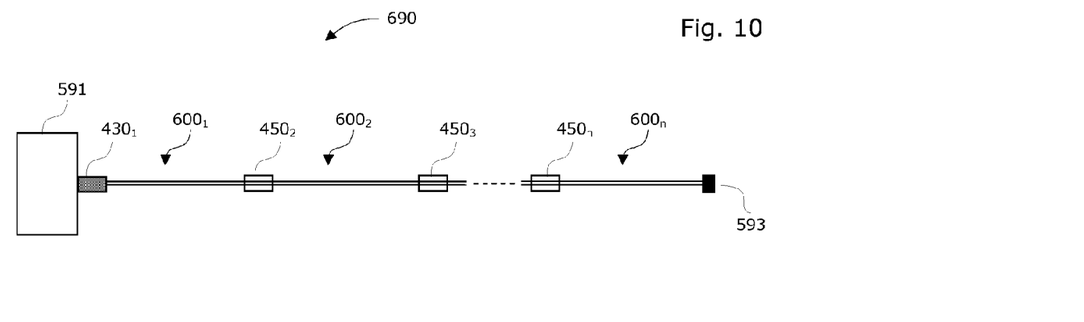
FIG. 10 is a diagrammatic side view illustrating an embodiment example of a detection system according to the invention, comprising a plurality of sensors with permanent connection modules between the sensors.
Figure 12:
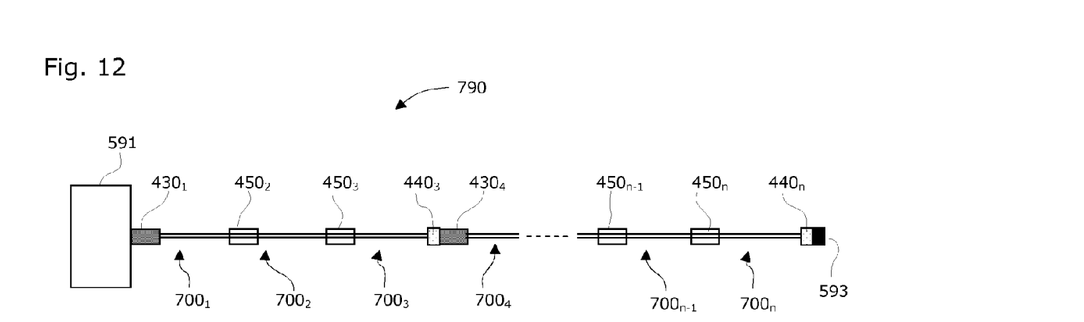
FIG. 12 is a diagrammatic side view illustrating an embodiment example of a detection system according to the invention, in a version comprising permanently connected sensors such as those in FIG. 11, forming groups which are themselves connected together by detachable connection modules such as those in FIG. 8 and FIG. 9.

FIG. 6, FIG. 10 and FIG. 12 illustrate different embodiment examples of a detection system 590, 690, 790 according to the invention. Such a system comprises a "composite" cable formed by a plurality of sensors connected together in series and the first one of which, i.e. the furthest upstream (on the left in the figures) is connected to a management unit or monitoring module 591. The different sensors of one and the same composite cable are each arranged in order to receive a different polling signal from the others.

FIG. 6 illustrates such a system 590 comprising a "composite" cable in which all the sensors $500_1$ to $500_n$ are identical, apart from their individual identification data items. These sensors are connected together in a sealed and detachable manner, by means of connectors referred to as detachable connectors of two complementary types $430_1$ to $430_n$ and $440_1$ to $440_n$, permanently fixed and connected at their two ends, for example by means of soldering. The connector $430_2$ (of a first type) of an upstream end of a sensor $500_2$ is thus removably connected with the connector $440_1$ (of a second type complementary to the first type) of the downstream end of the neighbouring sensor $500_1$ located upstream.

As illustrated in FIG. 7, each sensor comprises two connectors 430 and 440 of complementary types, each fixed or soldered permanently and under sealed encapsulation to one of the two ends of the bundle 208.

Figure 8:
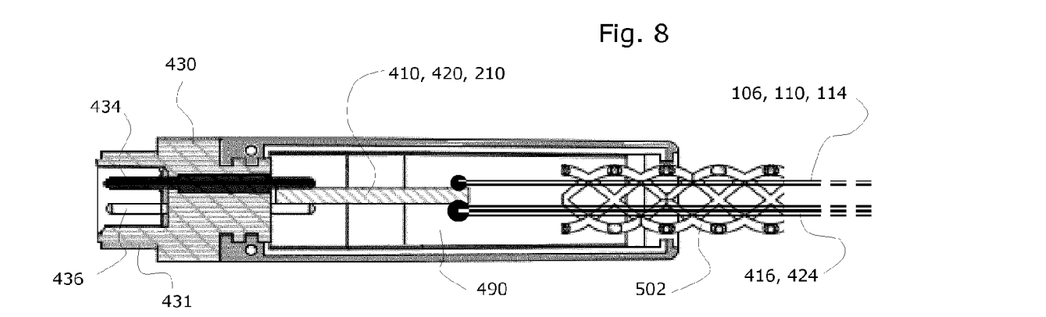
FIG. 8 and FIG. 9 are diagrammatic cross-sectional side views representing more precisely two detachable connection modules complementary with each other, for example within the sensors according to the invention such as those in FIG. 6.

In this embodiment, as illustrated in FIG. 8, one of the connectors, in this case referred to as upstream connection module 430, contains the different electronic modules of the sensor, in this case the management 210, communication 410 and power supply 420 modules, for example produced within the same electronic board. These electronic modules, as well as the connections of the elements of the bundle to the connector and to the electronic modules are encapsulated in a sealed manner. This connection module 430 carries upstream electrical connection means of the three wires of the communication bus 416 and 424 of the sensor, in this example in the form of male pin contacts 436 and 434. This connection module 430 also comprises upstream detachable fixing means, in this case a male thread 431.

Figure 9:
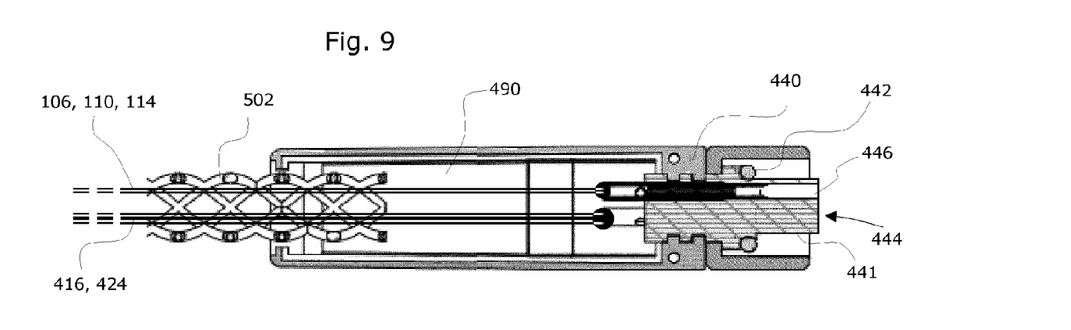

As illustrated in FIG. 9, the other connector, in this case referred to as extension module 440, carries downstream connection means, connected in an encapsulated and sealed manner with the three wires of the communication bus 416 and 424 of the sensor. These downstream electrical connection means are complementary to the upstream electrical connection means 436 and 434, and are in this case constituted by female plugs 444 and 446. This extension module 440 also comprises downstream detachable fixing means, in this case a female swivel thread 441, which are complementary to the upstream detachable fixing means.

One of the detachable connectors comprises detachable sealing means, in this case formed by an o-ring seal 442 carried by a shoulder around the downstream connection means and flattened during tightening against a shoulder located around the upstream connection means.

This embodiment makes it possible to obtain a connector diameter of the order of 10 mm to 15 mm.

As illustrated in FIG. 10, an embodiment of the invention can also comprise a detection system 690 operating in an identical manner but in which the sensors $600_1$ to $600_n$ are connected together by permanent connection means, for example by welding.

Figure 11:
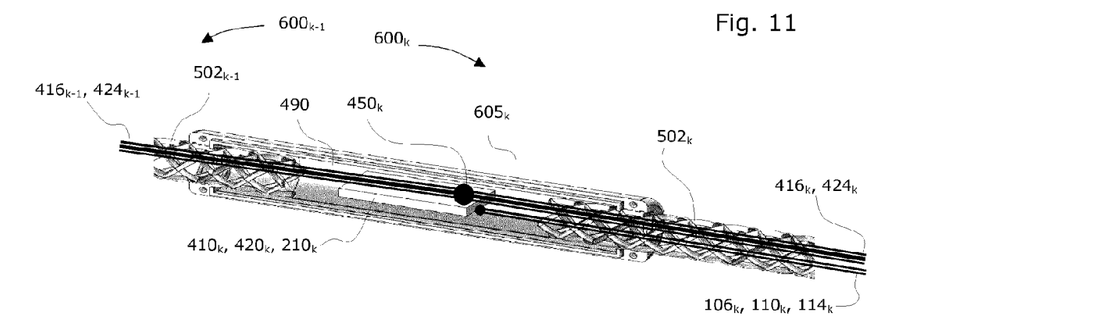
FIG. 11 is a perspective cross-sectional view representing more precisely a permanent connection module between two sensors, in an embodiment of sensors such as those in FIG. 10.

As illustrated in FIG. 11, these permanent connection means $450_k$, the communication module $410_k$ and the management module $210_k$ of each $500_k$ of said sensors are all sealed in an impervious and preferably rigid material 490. The communication module $410_k$ and the management module $210_k$ are for example formed within the same electronic board.

It is thus possible to form a composite cable that is non-detachable but which has improved leak tightness and/or improved mechanical strength than if it was formed by detachable sensors.

As illustrated in FIG. 12, an embodiment of the invention can also comprise a detection system 790 operating in an identical manner but using a composite cable formed by the detachable assembly of several cables which are themselves composite and non-detachable. It is thus possible to obtain a compromise between the flexibility of implementation and storage and the number of detachable connections which is adapted to different types of requirements.

By way of example, the sensors connected according to these different methods, possibly combined with each other, make it possible to produce operational composite cables of the order of 60 or even 120 sensors of 20 m each.

Within the connectors, detachable or permanent, all the connections of the conductive wires and the detection member as well as the elements or electronic modules in their entirety are preferably encapsulated in a sealed manner, typically embedded in a material 490 impervious to liquids and gasses and preferably rigid, for example a curable or polymerizable resin such as epoxy or polyurethane or an isocyanate-based resin.

Figure 13:
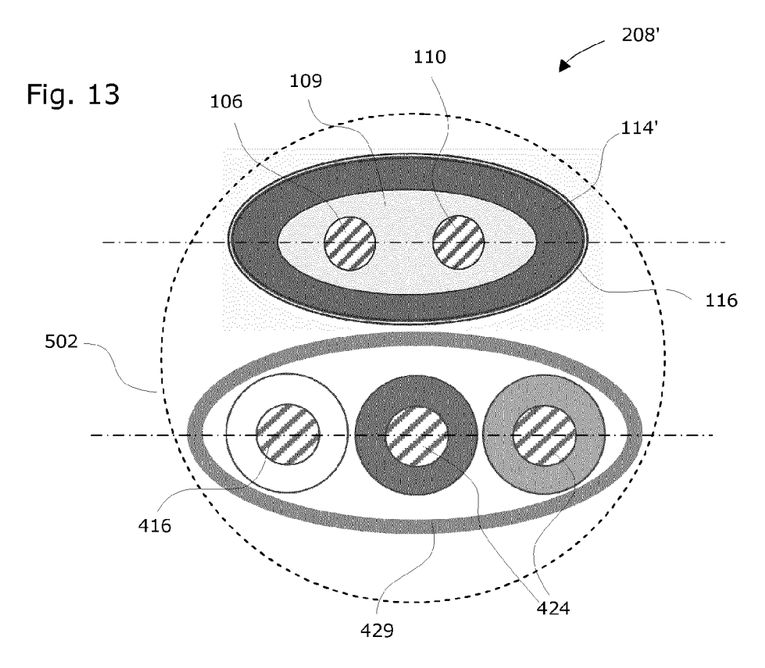
FIG. 13 is a diagrammatic cross-sectional view of the bundle illustrating another embodiment example of the bundle of a sensor according to the invention, including a detecting element with an oblong detection casing surrounding two twisted wires with an oblong protective casing surrounding a communication bus with three wires, inside a perforated protective sheath.

FIG. 13 is a diagrammatic cross-sectional view of the bundle illustrating another embodiment example of the bundle of a sensor according to the invention, in which only the differences thereof will be described.

In this embodiment of the invention, the bundle 208 comprises a detecting element comprising a detection casing 114' having an oblong cross section surrounding two insulated conductive wires 106 and 110. One of these conductive wires, for example the conductive wire 110, is used in order to detect leaks and is referred to as detection wire. The other conductive wire 106 is used as a continuity wire in order to detect a break of the detecting element and thus of the detection cable. These conductive wires 106 and 110 are insulated from each other, and with respect to the outside, by means of one and the same insulating casing 109 in which they are embedded.

The oblong shape of the detection casing allows for a larger outer surface, which can receive a greater quantity of liquid to be detected and thus render the detection more reliable and/or more rapid.

The detection casing 114' is covered by a continuous insulating casing 116, electrically insulating, pervious to the liquid to be detected and impervious to conductive liquids which can be present in the environment.

The detection casing 114' is twisted with another oblong casing 429 which surrounds or covers three wires forming the communication bus.

The oblong shape of these two casings can make it possible among other things to use prefabricated elements, and/or to obtain a tighter twist without requiring the presence of a specific or thicker central core, and thus to achieve greater compactness.

Preferably, the detection casing 114' and the casing 429 of the communication bus are twisted together such that their respective largest transverse dimensions are substantially parallel with each other over the entire length of the bundle, which makes it possible to limit the outer space requirement of the bundle.

The assembly is preferably protected by a perforated mechanical protection sheath 502 in order to allow the liquid to be detected to pass through.

According to an optional characteristic of this embodiment of the invention, the at least two conductive detection wires 106 and 110 are embedded in the one and the same insulating casing 109, which insulating casing is covered by the detection casing 114'.

In general, it is to be noted that all different embodiments of the transverse arrangement of the bundle of the invention can be combined with all the embodiments of the methods of connecting the sensors together.

Although the linear configuration for the sensor means and the detecting element is widespread in numerous fields, others can also be produced within the context of the invention.

Figure 14:
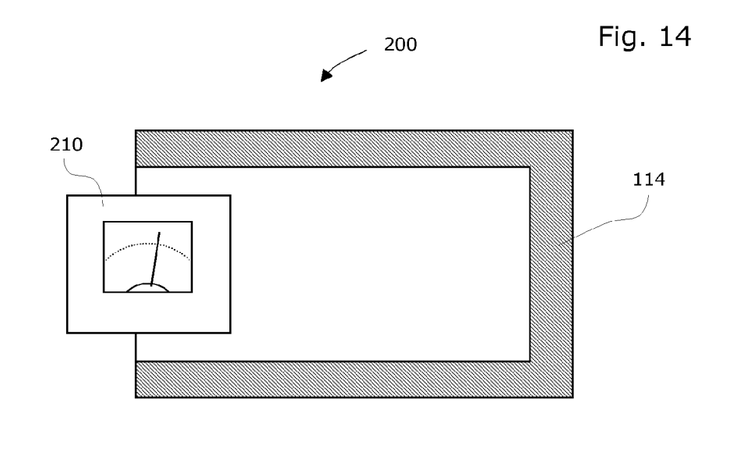
FIG. 14 illustrates diagrammatically in a side view another embodiment example of a detecting element according to the invention, with sensor means in the form of a loop.

For example, as illustrated in FIG. 14, the detection member 114 can be arranged in a loop between two connections of the management module 210, without using a return conductive wire, for example in order to protect the vertical bars or pipes, possibly with a plurality of sensors connected in series in order to protect a series of parallel bars or pipes. Although not illustrated in the figure, it is also envisaged to use a detection member formed by a detection casing connected in a loop in a similar manner, and which covers a single insulated conductive wire serving as a continuity verification wire.

Of course, the invention is not limited to the examples that have just been described, and numerous adjustments can be made to these examples without exceeding the scope of the invention.

The invention claimed is:

1. A detecting element for a cable for detecting leaks of electrically nonconductive liquid, said detecting element comprising—at least one sensor means which includes at least one detection member, produced at least partially from a material which swells upon contact with said liquid and which is filled with electrically conductive particles, such that: the detection member is conductive when it is not contaminated by said nonconductive liquid and the detection member loses its conductivity when it swells under the effect of said liquid; the sensor means has the form of an elongated bundle with a proximal end and a distal end with respect to a management module and which comprises moreover at least two insulated conductive wires, referred to as detection wires, forming a bundle extending over the entire length of the detecting element and which are connected by one end, referred to as proximal end, to said management module and in that said detection member is connected to an electronic module, referred to as the management module, arranged in order to detect the presence of said liquid by recording a decrease in the conductivity of said detection member, said management module being arranged in order to: detect the presence of liquid by recording a reduction in the conductivity of said detection member by means of a connection at one distal end of said detection member with the distal end of one of the conductive detection wires referred to as return wire, and verify the continuity of the detecting element by recording the electrical continuity of a circuit established by connecting the distal end of the other conductive detection wire, referred to as continuity wire, with the distal end of said return wire.

2. The detecting element according to claim 1, characterized in that the detection member has the shape of a casing surrounding at least one of said insulated conductive wires.

3. The detecting element according to claim 1, characterized in that the detection member is moreover surrounded by an electrically insulating casing, which is impervious to one or more conductive liquids while allowing the nonconductive liquid to be detected to pass through.

4. The detecting element according to claim 1, characterized in that the bundle including the detection member is surrounded by a perforated sheath providing a mechanical protection, and the texture of which is formed by two superimposed layers, each of said layers being constituted by several fibres parallel with each other twisted around said bundle, said layers being twisted in opposite directions from each other, said layers being secured to each other by means of fusion of their respective wires at their different points of intersection points.

5. A sensor or detection cable for the detection of leaks of nonconductive liquids comprising: at least one detecting element according to claim 2 and, a communication element, including: —at least one electronic communication module arranged in order to transmit a measurement or detection data item originating from said detecting element, in combination with a data item identifying said communication module and/or in response to a polling signal sent selectively to said communication module; and —at least one insulated conductive wired, referred to as communication wire, forming a communication bus provided in order to carry a communication signal including such a polling signal and/or such a measurement data item, from and/or to said communication module over the entire length of said detecting element in cooperation with at least one conductive wire constituting a voltage reference, for example an earth wire.

6. The sensor according to claim 5, characterized in that the communication module is arranged in order to use, in cooperation with a power supply wire used as reference, a single communication wire:
both for carrying and receiving a polling signal, and
both for carrying and transmitting a measurement data item transmitted in response to said polling signal;
thus forming a communication and power supply bus comprising only three conductive wires, i.e. a total of only five conductive wires in addition to the detection member.

7. The sensor according to claim 5, characterized in that it comprises a bundle enclosing, inside a perforated sheath providing a mechanical protection:
the two insulated detection wires including a return wire and a continuity wire,
three insulated conductive wires forming the communication bus and including
two insulated conductive wires providing an electrical power supply, and
an insulated conductive wire forming the communication wire in cooperation with one of said electrical power supply conductive wires;
in that said bundle comprises moreover a detection member having the form of a cylindrical detection casing surrounding one of said insulated conductive wires; and
in that said detection member and three other of said insulated conductive wires are arranged around a central core formed by the fifth of said insulated conductive wires.

8. The sensor according to claim 7, characterized in that the outer surface of the central core has transversally an alternation of protuberances and hollows, thus forming longitudinal grooves in which the different conductive wires surrounding said central core are arranged.

9. The sensor according to claim 7, characterized in that the conductive wires are twisted around the central core.

10. The sensor according to claim 5, characterized in that it comprises a bundle enclosing, inside a perforated sheath providing a mechanical protection:
two insulated conductive detection wires including a return wire and a continuity wire,
two insulated conductive wires providing an electrical power supply, and
an insulated conductive wire forming the communication wire;
said sensor being moreover characterized in that it comprises a detection member having the shape of a cylindrical detection casing surrounding two of said insulated conductive wires; and
in that said detection casing is twisted with the three other insulated conductive wires.

11. The sensor according to claim 10, characterized in that the detection casing has a transverse section which is in the form of a flattened circle, or an oblong transverse section, or an elliptical transverse section.

12. The sensor according to claim 5, characterized in that it moreover comprises two detachable connectors of complementary types, located at the two ends of said sensor, which are each connected to the corresponding ends of said conductive wire(s) of the communication bus, in order to enable a successive modular connection between several copies of said sensor in which each sensor is capable of transmitting measurement data and polling signals from one to the other of the sensors with which it is connected.

13. A detection system comprising a plurality of sensors according to claim 2, connected together in series and each arranged in order to receive a polling signal different from the others.

14. The system according to claim 13, characterized in that at least two sensors are connected to each other by permanent connection means, and in that said permanent connection means, the communication module and the management module of each of said sensors are all sealed in an impervious material.

15. A method for producing a detecting element according to claim 1, comprising the following steps:
depositing, around an insulated wire, of a detection casing made from a material filled with metallic particles and of a type capable of swelling under the effect of a contamination by a non-conductive liquid to be detected,
depositing, around said detection casing, of a swellable insulating layer which is impervious to at least one conductive liquid and pervious to said liquid to be detected,
twisting said detection member thus produced, as well as at least three other insulated conductive wires, around a central core comprising an insulating casing surrounding a conductive wire,
covering the bundle thus produced, by extruding a net or a perforated sheath for mechanical protection.

16. A method for producing a sensor according to claim 5, comprising the following steps:
depositing, around an insulated wire, of a detection casing made from a material filled with metallic particles and of a type capable of swelling under the effect of a contamination by a non-conductive liquid to be detected,
depositing, around said detection casing, of a swellable insulating layer which is impervious to at least one conductive liquid and pervious to said liquid to be detected,
twisting said detection member thus produced, as well as at least three other insulated conductive wires, around a central core comprising an insulating casing surrounding a conductive wire,
covering the bundle thus produced, by extruding a net or a perforated sheath for mechanical protection.

* * * * *